US012675315B2

(12) United States Patent
Zhang

(10) Patent No.: US 12,675,315 B2
(45) Date of Patent: Jul. 7, 2026

(54) CROSS-DEVICE TASK RELAY METHOD, CLOUD PLATFORM, AND NON-TRANSITORY STORAGE MEDIUM

(71) Applicant: GUANGDONG OPPO MOBILE TELECOMMUNICATIONS CORP., LTD., Dongguan (CN)

(72) Inventor: Kun Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 506 days.

(21) Appl. No.: 18/196,439

(22) Filed: May 12, 2023

(65) Prior Publication Data

US 2023/0281037 A1 Sep. 7, 2023

Related U.S. Application Data

(63) Continuation of application No. PCT/CN2021/120717, filed on Sep. 26, 2021.

(30) Foreign Application Priority Data

Nov. 13, 2020 (CN) .......................... 202011266766.6

(51) Int. Cl.
*G06F 9/48* (2006.01)
*G06F 9/50* (2006.01)

(52) U.S. Cl.
CPC .......... *G06F 9/4856* (2013.01); *G06F 9/5044* (2013.01)

(58) Field of Classification Search
CPC .......... A61B 2562/0257; A61B 5/0205; A61B 5/024; A61B 5/05; A61B 5/0507;
(Continued)

(56) References Cited

U.S. PATENT DOCUMENTS 8,880,648 B1 * 11/2014 Arora ............... H04N 21/43637
709/229
2007/0198682 A1 8/2007 Pazhyannur et al.
(Continued)

FOREIGN PATENT DOCUMENTS

CN 101141621 A 3/2008
CN 103546453 A 1/2014
(Continued)

OTHER PUBLICATIONS

First Office Action and search report dated Jun. 28, 2023 for the corresponding Chinese Patent Application No. 202011266766.6 and its English Translation provided by Applicant's Foreign Counsel.
(Continued)

*Primary Examiner* — Renee D Chavez
(74) *Attorney, Agent, or Firm* — Ladas & Parry, LLP

(57) ABSTRACT
A cross-device task relay method, a cloud platform, and a non-transitory storage medium, which belong to the field of task relay. The present method coordinates and organizes in advance, by means of a cloud platform, target devices that may be used for cross-device task relay, such that relay execution of the same task in different devices may be implemented without a user's perception, thereby improving the efficiency of cross-device task relay and avoiding the interruption of task execution coherence caused by device replacement.

15 Claims, 5 Drawing Sheets

(58) Field of Classification Search
CPC ....... A61B 5/08; A61B 5/0816; A61B 5/7264;
G01S 13/04; G01S 13/32; G01S 13/34;
G01S 13/42; G01S 13/522; G01S 13/536;
G01S 13/56; G01S 7/2883; G01S 7/2927;
G01S 7/415; G01S 13/88; G01S 7/411;
G06F 9/4856; G06F 9/5044; G06Q 10/10
See application file for complete search history.

(56) References Cited

U.S. PATENT DOCUMENTS

| | | | |
|---|---|---|---|
| 2016/0065626 A1 | 3/2016 | Jain et al. | |
| 2017/0357534 A1 | 12/2017 | Gupta et al. | |
| 2020/0195725 A1 | 6/2020 | Liang et al. | |
| 2022/0052867 A1* | 2/2022 | Nakano | H04W 4/023 |

FOREIGN PATENT DOCUMENTS

| | | |
|---|---|---|
| CN | 105785766 A | 7/2016 |
| CN | 109660842 A | 4/2019 |
| CN | 111431968 A | 7/2020 |
| CN | 111740887 A | 10/2020 |
| CN | 112258086 A | 1/2021 |
| CN | 112307405 A | 2/2021 |

OTHER PUBLICATIONS

Chinese Second Office Action and search report from the corresponding Chinese Patent Application No. 202011266766.6, mailed Mar. 7, 2024 (13 pages).
Chinese Third Office Action from the corresponding Chinese Patent Application No. 202011266766.6, mailed May 12, 2024 (13 pages).
European Search Report from the corresponding European Patent Application No. 21890828.3, mailed Mar. 15, 2024 (9 pages).
International Search Report (ISR) dated Dec. 30, 2021 for Application No. PCT/CN2021/120717 and its English translation provided by WIPO.
Written Opinion (WOSA) dated Dec. 30, 2021 for Application No. PCT/CN2021/120717 and its English translation provided by WIPO.

* cited by examiner

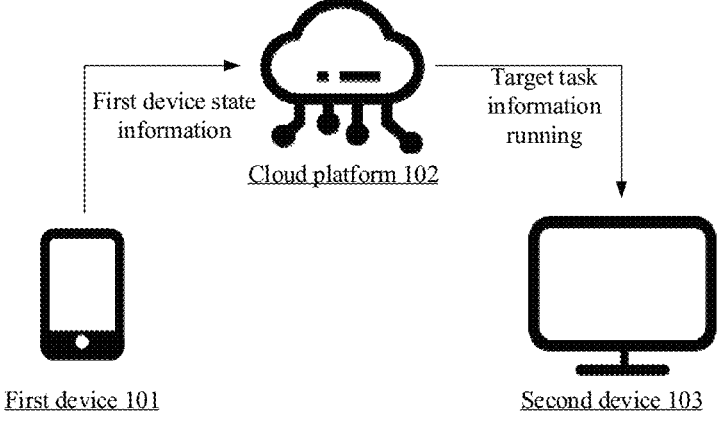

First device state information

Target task information running

Cloud platform 102

First device 101

Second device 103

FIG. 1

Acquiring a first device state information of a first device, in which the first device state information at least includes a target task information running in the first device — 201

Determining a target device according to the first device state information, in which the target device is different from the first device — 202

In response to the first device and the target device satisfying a first condition, controlling the target device to continue to execute the target task — 203

FIG. 2

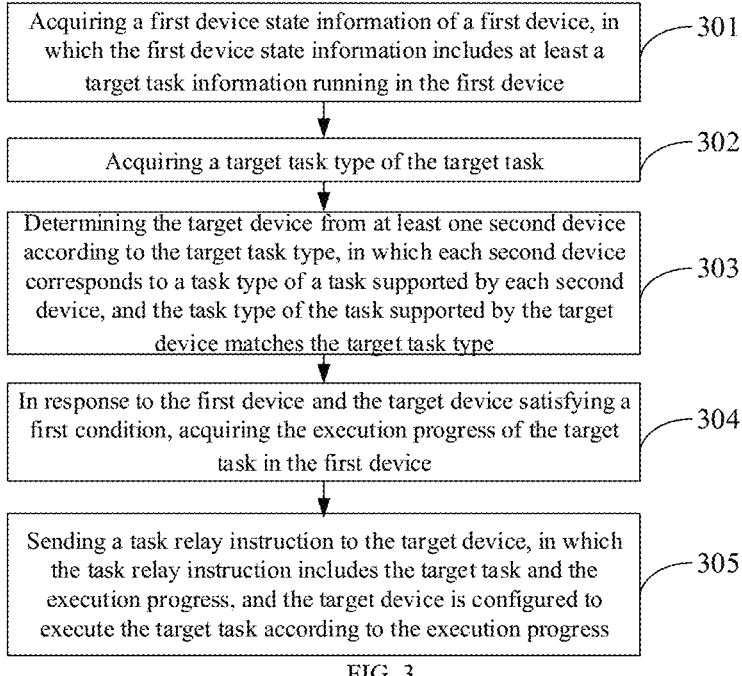

Acquiring a first device state information of a first device, in which the first device state information includes at least a target task information running in the first device — 301

Acquiring a target task type of the target task — 302

Determining the target device from at least one second device according to the target task type, in which each second device corresponds to a task type of a task supported by each second device, and the task type of the task supported by the target device matches the target task type — 303

In response to the first device and the target device satisfying a first condition, acquiring the execution progress of the target task in the first device — 304

Sending a task relay instruction to the target device, in which the task relay instruction includes the target task and the execution progress, and the target device is configured to execute the target task according to the execution progress — 305

FIG. 3

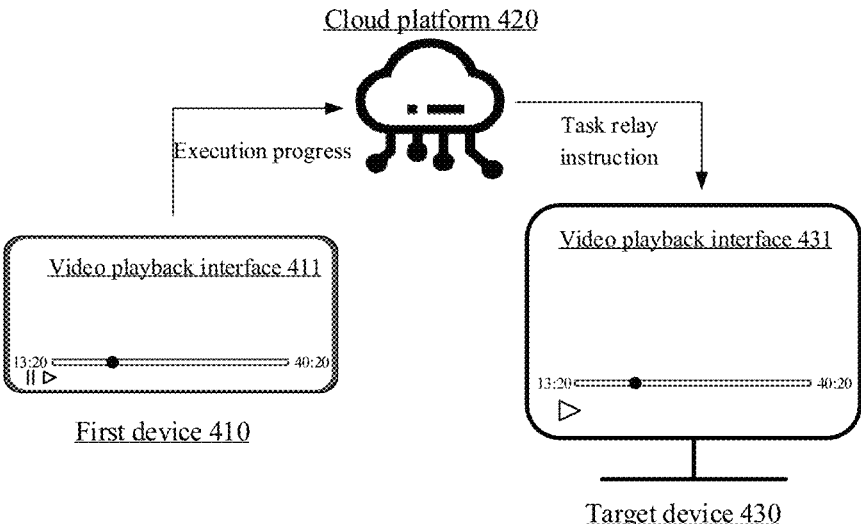

Cloud platform 420

Execution progress

Task relay instruction

Video playback interface 411

13:20 ━━━━━●━━━━━━━━━ 40:20
II ▷

First device 410

Video playback interface 431

13:20 ━━━━━●━━━━━━━━━━━━━ 40:20
▷

Target device 430

FIG. 4

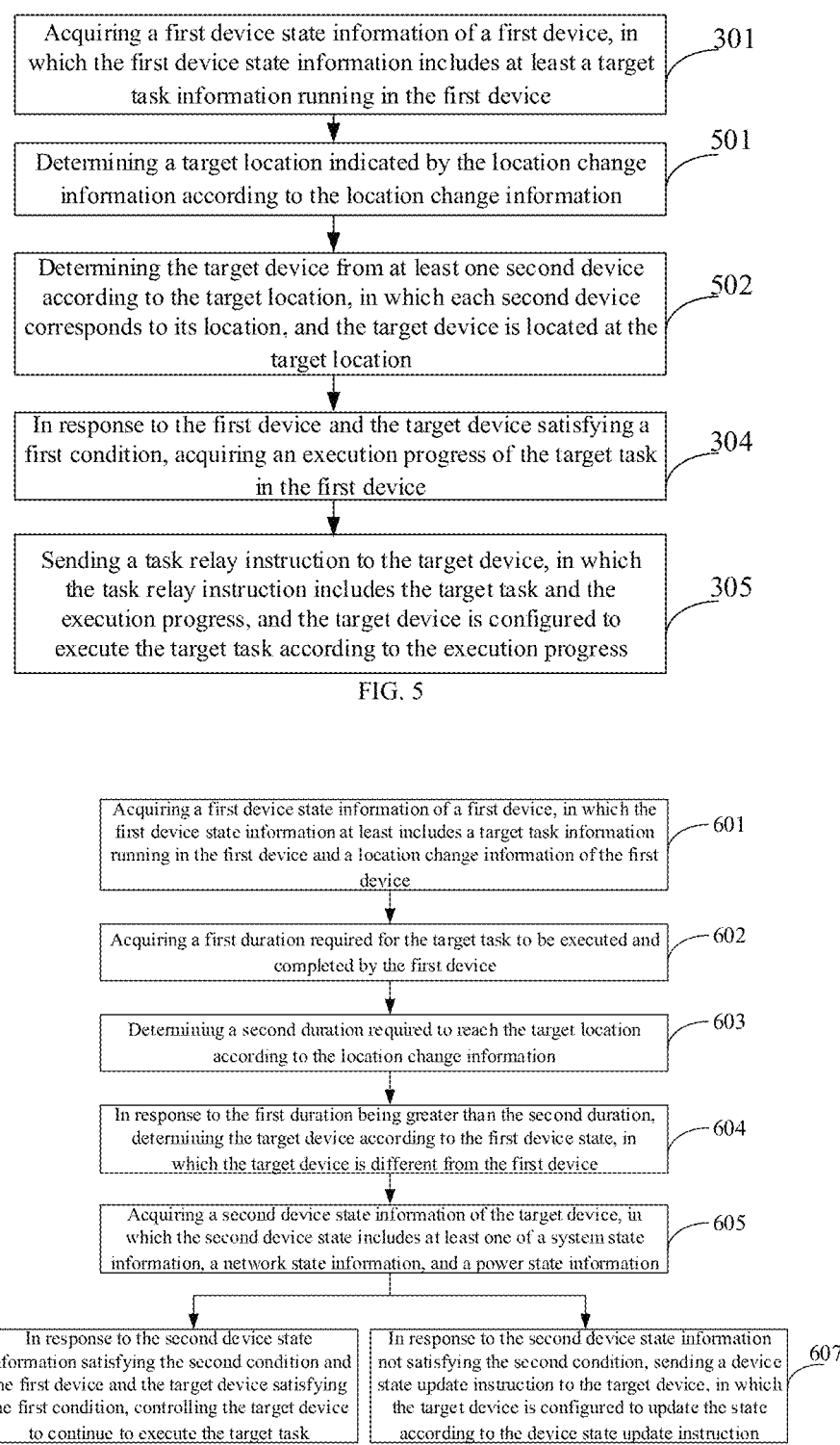

Acquiring a first device state information of a first device, in which the first device state information includes at least a target task information running in the first device ⟋301

Determining a target location indicated by the location change information according to the location change information ⟋501

Determining the target device from at least one second device according to the target location, in which each second device corresponds to its location, and the target device is located at the target location ⟋502

In response to the first device and the target device satisfying a first condition, acquiring an execution progress of the target task in the first device ⟋304

Sending a task relay instruction to the target device, in which the task relay instruction includes the target task and the execution progress, and the target device is configured to execute the target task according to the execution progress ⟋305

FIG. 5

Acquiring a first device state information of a first device, in which the first device state information at least includes a target task information running in the first device and a location change information of the first device ⟋601

Acquiring a first duration required for the target task to be executed and completed by the first device ⟋602

Determining a second duration required to reach the target location according to the location change information ⟋603

In response to the first duration being greater than the second duration, determining the target device according to the first device state, in which the target device is different from the first device ⟋604

Acquiring a second device state information of the target device, in which the second device state includes at least one of a system state information, a network state information, and a power state information ⟋605

In response to the second device state information satisfying the second condition and the first device and the target device satisfying the first condition, controlling the target device to continue to execute the target task ⟍606

In response to the second device state information not satisfying the second condition, sending a device state update instruction to the target device, in which the target device is configured to update the state according to the device state update instruction ⟋607

FIG. 6

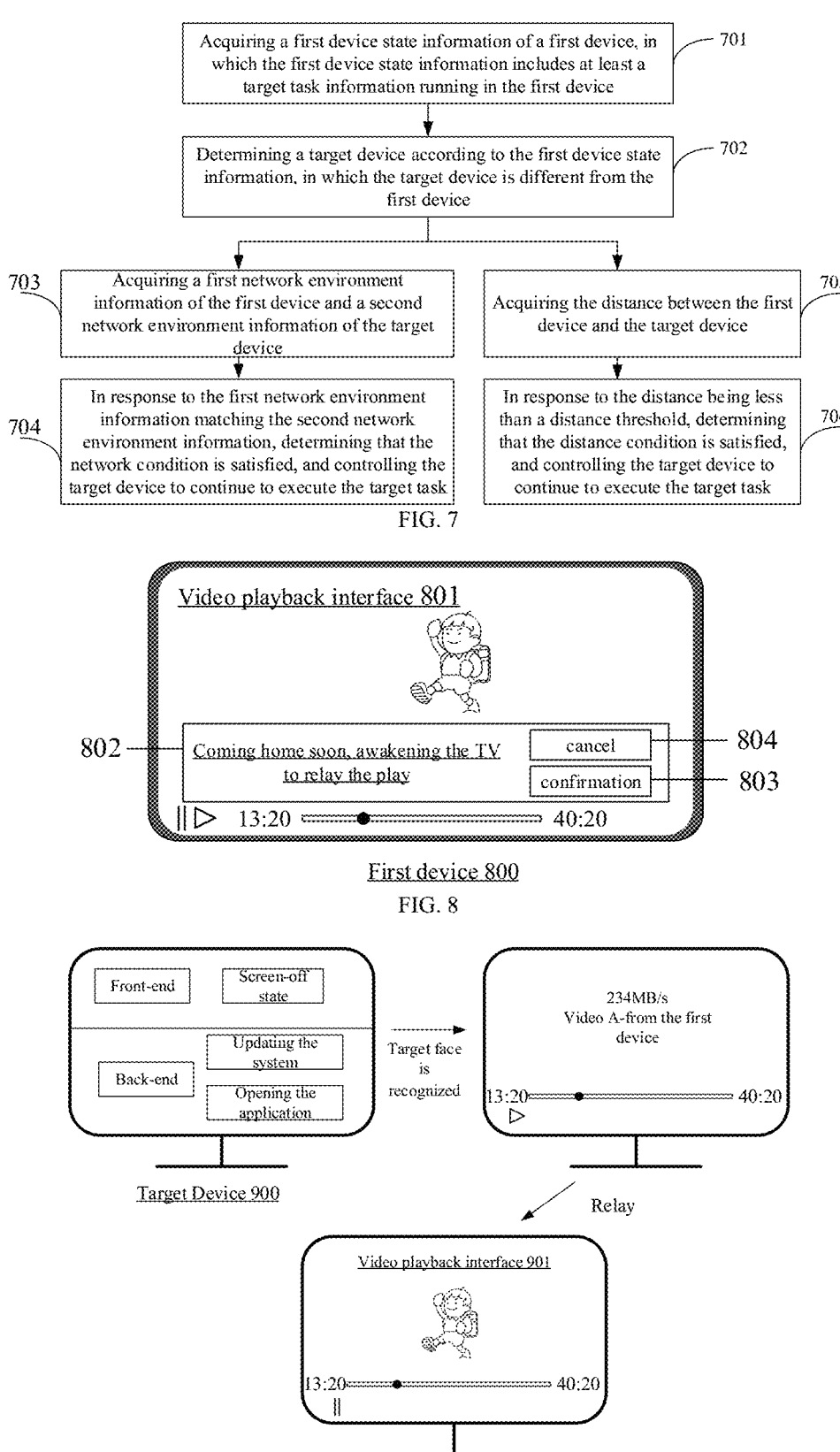

Acquiring a first device state information of a first device, in which the first device state information includes at least a target task information running in the first device — 701

Determining a target device according to the first device state information, in which the target device is different from the first device — 702

703 — Acquiring a first network environment information of the first device and a second network environment information of the target device 705 — Acquiring the distance between the first device and the target device 704 — In response to the first network environment information matching the second network environment information, determining that the network condition is satisfied, and controlling the target device to continue to execute the target task 706 — In response to the distance being less than a distance threshold, determining that the distance condition is satisfied, and controlling the target device to continue to execute the target task

FIG. 7

Video playback interface 801

802 — Coming home soon, awakening the TV to relay the play

804 — cancel

803 — confirmation

13:20 ⸺⚫⸺ 40:20

First device 800

FIG. 8

Target Device 900

Front-end     Screen-off state

Back-end     Updating the system

Opening the application

Target face is recognized

234MB/s
Video A-from the first device

13:20⸺⚫⸺40:20

Relay

Video playback interface 901

CROSS-DEVICE TASK RELAY METHOD, CLOUD PLATFORM, AND NON-TRANSITORY STORAGE MEDIUM

CROSS-REFERENCE TO RELATED APPLICATIONS

This application is a continuation of International (PCT) Patent Application No. PCT/CN2021/120717 filed on Sep. 26, 2021, which claims priority to Chinese Patent Application with Application No. 202011266766.6 filed on Nov. 13, 2020 and entitled "CROSS-DEVICE TASK RELAY METHOD, APPARATUS, CLOUD PLATFORM AND NON-TRANSITORY STORAGE MEDIUM", the contents of which are herein incorporated by reference in their entireties.

TECHNICAL FIELD

The embodiments of the present disclosure relate to the field of task relays, and in particular to a cross-device task relay method, a cross-device task relay apparatus, a cloud platform, and a non-transitory storage medium.

BACKGROUND

As the fragmentation of time, people often spend trivial time and the time on the road to do a coherent thing, such as watching a video, listening to a book, reading an electronic document, etc. However, due to the switching of the environment and the replacement of relied device, the continuity of one thing is interrupted.

For example, in the related art, a user watches a movie on a mobile phone while taking the subway, but the movie has not been finished when the user gets home. If the user wants to switch to a computer to continue to watch at home, a video playback application needs to be manually reopened, the video resource needs to be searched, and the video needs to be played again on the computer. It is clear that when switching devices to watch videos, many repeated operations are required.

Adopting the cross-device video playback method in the related art will obviously increase the viewing cost for the user to watch the same movie, and the operation process is relatively cumbersome.

SUMMARY

In an aspect, an embodiment of the present disclosure provides a cross-device task relay method, the method is performed by a cloud platform. The method includes: acquiring a first device state information of a first device, in which the first device state information includes at least a target task information running in the first device; determining a target device according to the first device state information, in which the target device is different from the first device; in response to the first device and the target device satisfying a first condition, controlling the target device to continue to execute the target task.

In another aspect, an embodiment of the present disclosure provides a cloud platform, and the cloud platform includes a processor and a memory. The memory stores at least one program code, and the program code is loaded and executed by the processor to realize the above-mentioned cross-device task relay method.

In a third aspect, an embodiment of the present disclosure provides a computer-readable non-transitory storage medium, the computer-readable non-transitory storage medium stores at least one program code, and the program code is loaded and executed by the processor to implement the above-mentioned cross-device task relay method.

BRIEF DESCRIPTION OF THE DRAWINGS

In order to more clearly illustrate the technical solutions in the present embodiment of the present disclosure, the drawings that need to be used in the description of the embodiments will be briefly introduced below. Obviously, the drawings in the following description are only some embodiments of the present disclosure. For those skilled in the art, other drawings may also be obtained based on these drawings without creative effort.

FIG. 1 is a schematic diagram of an implementation environment according to an exemplary embodiment of the present disclosure.

FIG. 2 is a flowchart of a cross-device task relay method according to an exemplary embodiment of the present disclosure.

FIG. 3 is a flowchart of a cross-device task relay method according to another exemplary embodiment of the present disclosure.

FIG. 4 is a schematic diagram of a cross-device video playback process according to an exemplary embodiment of the present disclosure.

FIG. 5 is a flowchart of a cross-device task relay method according to another exemplary embodiment of the present disclosure.

FIG. 6 is a flowchart of a cross-device task relay method according to another exemplary embodiment of the present disclosure.

FIG. 7 is a flowchart of a cross-device task relay method according to another exemplary embodiment of the present disclosure.

FIG. 8 is a schematic process diagram of a first device triggering a task relay according to an exemplary embodiment of the present disclosure.

FIG. 9 is a schematic process diagram of a target device triggering a task relay.

DETAILED DESCRIPTION

Figure 10:
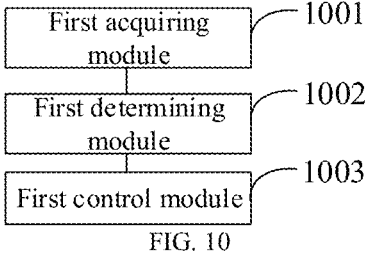
FIG. 10 is a structural block diagram of a cross-device task relay apparatus according to an embodiment of the present disclosure.

In order to make the purpose, technical solutions and advantages of the present disclosure clearer, the embodiments of the present disclosure will be further described in detail below in conjunction with the accompanying drawings.

As illustrated in FIG. 1, which is a schematic diagram of an implementation environment according to an exemplary embodiment of the present disclosure. The implementation environment includes a first device 101, a cloud platform 102 and at least one second device 103.

The first device 101 is a device with a data transmission function, which may be a portable electronic device such as a smart phone, a tablet computer, a smart speaker, a smart watch, an e-book reader, etc. In the present embodiment of the present disclosure, the first device 101 may send its device state (a first device state information) to the cloud platform 102 in real time, in order that the cloud platform 102 may determine a target device from the at least one second device 103 according to the first device state information of the first device 101. The target device is configured to automatically execute the current task running in the first device. The first device state information may be a running program, a task being executed (playing music, playing video, playing e-book, etc.) or the like.

The first device 101 is connected to the cloud platform 102 in a wired or wireless manner.

The cloud platform 102 is a cloud server of the first device 101 and the second device 103. The cloud platform 102 is a device capable of receiving, storing, and analyzing the device state transmitted by each device, controlling each device to perform cross-device task relay, and etc. The cloud platform 102 may be an independent physical server, or a server cluster composed of multiple physical servers, or a distributed system. The cloud platform 102 may also provide cloud services, cloud databases, cloud computing, cloud functions, cloud storage, network services, cloud communications, middleware services, domain name services, security services, content delivery network (CDN), big data and artificial intelligence platforms. In the present embodiment of the present disclosure, the cloud platform 102 may receive the first device state information sent by the first device 101 in real time, and analyze the second device 103 capable of being used for task relay according to the first device state information. Optionally, the cloud platform 102 may synchronize the running task sent by the first device 101 to the second device 103 during the task relay process.

The cloud platform 102 is connected to at least one second device 103 in the wired or wireless manner.

The second device 103 is a device with a task relay function. The second device 103 may be a smartphone, a smart speaker, a tablet, a smart TV, an e-book reader, a personal computer, etc. In the present embodiment of the present disclosure, the second device 103 may receive a task relay instruction sent by the cloud platform 102. The task relay instruction at least includes the task to be relayed (in other words, the running task in the first device 101). And the second device 103 may continue to perform the task on the second device.

It should be noted that the first device 101 and the second device 103 are different devices, and the first device 101 and the second device 103 need to have the same user account. The user account may be an account issued by the cloud platform 102, or another third-party application account, which is not limited by the embodiments of the present disclosure.

As illustrated in FIG. 2, which is a flowchart of a cross-device task relay method according to an exemplary embodiment of the present disclosure. In the present embodiment of the present disclosure, the method performed by the cloud platform shown in FIG. 1 is taken as an example for illustration. The method includes the following operations.

Operation 201: acquiring a first device state information of a first device, in which the first device state information at least includes a target task information running in the first device.

The first device state information may include the target task information running in the first device, the current target task progress, the current location information, etc. The embodiments of the present disclosure do not limit the type of information contained in the first device state information. The first device state information at least includes the state information required by the cloud platform for cross-device task relay.

In a possible embodiment, the first device sends the target task information running in the first device to the cloud platform in real time. Correspondingly, the cloud platform acquires the first device state information of the first device.

In an illustrative example, the target task may be a video playing task, an e-book reading task, an email reply task, an e-book playing task, a song playing task, a game task, etc. The embodiments of the present disclosure do not limit the specific content of the target task.

Optionally, since the first device state information and other information may involve the user's private information, in order to prevent the first device from sending the state information involving the user's private information to the cloud platform (resulting in leakage of the user's private information), in a possible embodiment, before sending the first device state information, data desensitization may be performed on the first device state information captured, and then the first device state information after subjecting to data desensitization is sent to the cloud platform.

In other possible embodiments, the user may set up the tasks that allow the device state to be uploaded in the first device. For example, an email task may involve the user's private information, then the email task is not allowed to be uploaded to the cloud platform. Video tasks and other tasks, which do not involve user privacy information, are allowed to be uploaded to the cloud platform. The user may set up the target applications that allow uploading their device state. For example, set up that video applications, reading applications, and music playback applications are allowed to upload the target task information to the cloud platform, and applications involving user privacy information such as e-banking are not allowed to upload the target task information to the cloud platform.

If the first device sends the first device state information to the cloud platform in real time, it will obviously increase the power consumption of the first device and affect the battery life of the first device. Therefore, in order to decrease the power consumption of the first device, in a possible embodiment, the first device is equipped with a trigger control. If the user needs or predicts that he may have the need to perform the same cross-device task, he may click the trigger control, and the first device receives a click operation on the trigger control, and sends the first device state information to the cloud platform. Optionally, when a running target task is detected, the first device sends the first device state information to the cloud platform; when the first device is in a standby state or the front-end does not run the target task, then there is no need to send the first device state information to the cloud platform. Optionally, the first device provides multiple cross-device task options, and the user may pre-select at least one of them. When the first device detects that there is a pre-selected target running in the front-end, the first device state information is sent to the cloud platform. Optionally, the target task information may also be the task set up by the user that allows the device state to be uploaded.

In other possible embodiments, in order to further decrease the power consumption of the first device, it may be set to send the first device state information to the cloud platform every preset duration, for example, every 30 minutes; or to send the updated first device state information to the cloud platform when the device state of the first device changes.

Optionally, the cloud platform may need to process the first device state information uploaded by several first devices. In order to distinguish the each device state uploaded by different first devices, the cloud platform associates and stores each first devices and its corresponding first device state information.

Operation 202: determining a target device according to the first device state information, in which the target device is different from the first device.

In a cross-device task relay scenario, the first device and the target device are different devices. In a possible embodiment, in order to ensure that the target task information is transmitted in the trusted device, both the first device and the target device have been registered on the cloud platform, or the first device and the target device are devices authorized by the same user to carry out the task relay; or the target device and the first device are associated devices; or the first device and the target device are devices with the same user account, and the user account may be created for the user by the cloud platform or authorized by the same third-party application.

In a possible application scenario, the cloud platform associates and stores the task relay devices corresponding to the same user account. The task relay devices include the first device and at least one second device. When receiving the first device state information sent by the first device, the cloud platform obtains the user account information of the first device, and search for at least one second device (device other than the first device in the task relay devices) from the cloud platform according to the user account information, and then determine the target device that may perform cross-device task relay from the second devices.

Regarding the method of determining the target device, in a possible embodiment, the cloud platform may determine the second device capable of executing the target task as the target device according to the target task information contained in the first device state information. For example, if the target task is video playing, the second device that may play video is selected from the second device as the target device. Alternatively, the cloud platform may predict the location of the relay device based on the location information contained in the first device state information, and determine the second device at the location as the target device. Alternatively, the user may pre-set a relay priority of at least one second device, and the cloud platform obtains the relay priority, and then determines the target device according to the relay priority of at least one second device.

In the cross-device task relay process shown in the present embodiment of the present disclosure, the cloud platform plays an intermediate role of analyzing the first device state information and coordinating and organizing the target device according to the first device state information in advance. In a possible embodiment, the cloud platform receives the first device state information sent by the first device, and determines the target device according to the first device state information.

Operation 203: in response to the first device and the target device satisfying a first condition, controlling the target device to continue to execute the target task.

In a possible embodiment, after determining the target device according to the first device state information, the cloud platform may directly synchronize the target task information in the first device to the target device, in other words, the cloud platform obtains the target task information running in the first device, and controls the target device to execute the target task synchronously.

Considering the power consumption of the target device, in order to decrease the power consumption of the target device, in a possible embodiment, a first condition (i.e., task relay condition) is set up, and when the first condition is satisfied, the cloud platform may send the task relay instruction to the target device, in order that the target device executes the target task according to the task relay instruction.

The first condition is preset by the user, or is set by default by the system. For example, the first condition may be that when the distance between the first device and the target device is detected to be relatively close, indicating that the user may need to carry out the cross-device task relay, then the target task information is synchronized to the target device. Alternatively, when the first device is detected that the target task information is suspended, indicating that the user may want to replace the device to continue the operation, then the target device is controlled to automatically execute the target task. Alternatively, the first device and the target device are detected to be connected to the same network, for example, the same wireless network, indicating that the first device is relatively close to the target device, and the target device is controlled to perform the target task.

In summary, in the present embodiment of the present disclosure, the first device and the target device are connected through the cloud platform, such that the cloud platform may pre-coordinate and organize target devices available for the cross-device task relay according to the obtained first device state information, and when the first condition is met, the target device is automatically controlled to execute the target task of the first device. Compared with the related art, which requires the user to manually select the second device, select the application program and execute the target task, the cross-device task relay method provided by the embodiments of the present disclosure may realize the same task on different devices without the user's perception, decreasing the required relay execution processes for the same task in different devices and decreasing the operational complexity of executing cross-device tasks, thereby improving the efficiency of cross-device task relay, and meanwhile avoiding the interruption of the coherent execution of tasks due to device replacement.

Optionally, the determining the target device according to the first device state information includes the following operations.

Obtaining the target task type of the target task.

Determining the target device from at least one second device according to the target task type, in which each second device corresponds to a task type of a task supported by each second device, and the task type of the task supported by the target device matches the target task type.

Optionally, the first device state information also includes a location change information of the first device.

The determining the target device according to the first device state information includes the following operations.

Determining the target location indicated by the location change information according to the location change information.

Determining the target device from the at least one second device according to the target location, in which each second device corresponds to its location, and the target device is located at the target location.

Optionally, the first device state information also includes a location change information of the first device.

The determining the target device from the at least one second device according to the target task type includes the following operations.

Determining the target location indicated by the location change information according to the location change information.

Determining the target device from at least one second device according to the target location and the target task type in which he target device is located at the target location, and the task type of the task supported by the target device matches the target task type.

Optionally, before the determining the target device according to the first device state information, the method further includes the following operations.

Acquiring a first duration required for the target task to be executed and completed in the first device.

Determining a second duration required to reach the target location according to the location change information.

In response to the first duration being greater than the second duration, and executing the operation of determining the target device according to the first device state information.

Optionally, the first condition includes any one of a distance condition and a network condition.

The in response to the first device and the target device satisfying the first condition, controlling the target device to continue to execute the target task includes the following operations.

Obtaining a first network environment information of the first device and a second network environment information of the target device; in response to the first network environment information matching the second network environment information, determining that the network condition is met, and controlling the target device to continue to execute the target task. Alternatively, obtaining the distance between the first device and the target device; in response to the distance being less than a distance threshold, determining that the distance condition is met, and controlling the target device to continue to execute the target task.

Optionally, the controlling the target device to continue to execute the target task also includes the following operations.

Sending a task relay prompt to the first device, in which the task relay prompt is configured to remind whether to carry out the cross-device task relay.

In response to receiving a confirmation operation to the task relay prompt, controlling the target device to continue to execute the target task.

Optionally, the controlling the target device to continue to execute the target task includes the following operations.

Obtaining an execution progress of the target task in the first device.

Sending a task relay instruction to the target device, in which the task relay instruction includes the target task and the execution progress, and the target device is configured to execute the target task according to the execution progress.

Optionally, before the in response to the first device and the target device satisfying the first condition, controlling the target device to continue to execute the target task, the method further includes the following operations.

Acquiring a second device state information of the target device, in which the second device state information includes at least one of a system state information, a network state information, and a power state information.

In response to the second device state information satisfying the second condition, executing the operation of in response to the first device and the target device satisfying the first condition, controlling the target device to continue to execute the target task, in which the second condition includes at least one of a system condition, a network condition and a power supply condition.

In response to the second device state information not satisfying the second condition, sending a device state update instruction to the target device, in which the target device is configured to update the state according to the device state update instruction.

In a possible application scenario, in the process of cross-device task relay, it is necessary to consider the execution progress of the same task in the original device. If the target task is automatically executed on the target device, while the progress of that task on the original device (the first device) of the user is ignored, it is clear that device replacement will affect the continuity of the task relay. Therefore, in a possible embodiment, during the task relay process, the execution progress of the target task in the first device is obtained and then sent to the target device, such that the target device may automatically update to the execution progress, thereby ensuring the consistency of execution of the same task in different devices.

In an illustrative example, as shown in FIG. 3, which is a flowchart of a cross-device task relay method according to another exemplary embodiment of the present disclosure. In the present embodiment of the present disclosure, this method applied in the cloud platform as shown in FIG. 1 is taken as an example for illustration. The method includes the following operations.

Operation 301: acquiring a first device state information of a first device, in which the first device state information includes at least a target task information running in the first device.

For the embodiments of this operation, reference may be made to the foregoing embodiments, and details are not described in the present embodiment here.

Operation 302: acquiring a target task type of the target task.

Since the target task needs to be relayed in the target device, it is first necessary to ensure that the target device is able to perform the target task, so as to prevent the screened target device from being unable to perform the target task, resulting in a task relay failure. Therefore, in a possible embodiment, the target task type of the target task (the relay task) is considered as a filtering condition for filtering out the target device from a plurality of second devices.

The target task type is associated with the target task. If the target task is a video playback task, the corresponding target task type is a video playback type; if the target task is a music playback task, the corresponding target task type is a music playback type; if the task is a text input task, the corresponding target task type is a text input type; if the target task is an e-book reading task, the corresponding target task type is an electronic reading type. The embodiments of the present disclosure do not limit the target task type.

Operation 303: Determining the target device from at least one second device according to the target task type, in which each second device corresponds to a task type of a task supported by the each second device, and the task type of the task supported by the target device matches the target task type.

Different second devices correspond to the types of tasks they themselves support. For example, smart TVs may support video playback tasks, music playback tasks, etc.; smart speakers may support music playback tasks, etc.; tablet computers may support video playback tasks, music playing tasks, e-book reading tasks, etc.

When determining the target device according to the task relay requirements, it needs to be ensured that the target device is able to support the execution of the tasks with the target task type. Therefore, in a possible embodiment, the target device may be determined from at least one second device according to the target task type.

In an illustrative example, if the target task type is a video playback type, select a device capable of playing video from at least one second device as the target device, such as a (smart) TV, a projector, a tablet computer etc.; if the target task type is music playback type, select a device capable of playing music from at least one second device as the target device, such as a smart speaker, an audio device, a TV, etc.; if the target task type is an e-reading type, select a device capable of electronic reading from at least one second device as the target device, such as a smart phone, an e-reader, a tablet computer, or the like.

In a possible application scenario, if there are at least two candidate relay devices in the second devices the supportive task type of which matches the target task type. For example, if the target task type is the video playback type, the second device such as smart TVs, tablets, etc. may be used as target devices. In order to avoid the same task to be relayed on multiple target devices at the same time which occupy other device resources, in a possible embodiment, the device relay priority is set up. The target device is determined from multiple candidate relay devices according to the device relay priority.

In an illustrative example, the method for determining the target device from candidate relay devices according to device relay priority may include the following operations.

First, in response to there are at least two candidate relay devices, and the supportive task type of candidate relay devices matches the target task type, obtaining the device relay priority of the target task type.

The candidate relay device is the second device that supports the target task type. Exemplary, if the target task type is the video playback type, the second device includes a smart TV, a projector, a tablet computer, a smart speaker, an e-reader. And the smart TV, the projectors, and the tablet computer all support the target task type. Correspondingly, the smart TV, the projector, and the tablet computer are determined as candidate relay devices.

Optionally, the device relay priority may be divided according to different target task types. For example, for video playback type, the device relay priority is: the smart TV>the tablet computer>the smart phone; for music playback type, the device relay priority is: the smart speaker>the audio device>the smartphone; for e-reading type, the device relay priority is: the e-book reader>the tablet computer>the smartphone.

In a possible embodiment, the user may set up the device relay priority corresponding to different task types based on their own needs, and submit the device relay priority to the cloud platform for storage. Therefore, when it is determined that there are at least two candidate relay devices that support the corresponding target task type, the device relay priority of the target task type may be obtained, and the target device may be determined from multiple candidate relay devices according to the device relay priority.

Second, determining the candidate relay device with the highest device relay priority as the target device.

In a possible embodiment, determining the candidate relay device with the highest device relay priority as the target device is set up. For example, if the target task type is the video playback type, there are multiple candidate relay devices such as a smart TV, a tablet computer, a smart phone, a projection device, etc., in order to avoid the occupation of device resources by executing the same task in multiple candidate relay devices, the device relay priority of the above-mentioned candidate relay devices in the target task type of video playback is obtained: the smart TV>the projection device>the tablet computer>the smart phone. It is clear that the smart TV has the highest priority, so the smart TV is the target device.

Optionally, if the candidate relay device with the highest device priority is not able to perform the task relay, for example, the power is not connected, the battery is low, the network state is poor, or it is executing other tasks (not able to perform multiple tasks at the same time), etc., the next-level candidate relay device may be selected as the target device according to the device relay priority. For example, if the smart TV is not able to perform task relay, the next-level projection device is adopted as the target device.

Operation 304: in response to the first device and the target device satisfying the first condition, and acquiring the execution progress of the target task in the first device.

In order to maintain the execution consistency of the target task in different devices, in a possible embodiment, synchronizing the execution progress of the target task in the first device is realized. In other words, the cloud platform obtains the execution of the target task in the first device, and send the execution progress to the target device, such that the task execution progress in the two devices is the same, thereby ensuring the continuity of task transfer in different devices.

In an illustrative example, as shown in FIG. 4, which is a schematic diagram of a cross-device video playback process according to an exemplary embodiment of the present disclosure. Before the task relay (the task relay condition is satisfied), the first device 410 plays video A through the video playback interface 411, the total playing time of video A is 40:20, and video A is played to 13:20, then 13:20 is determined as the execution progress of the target task and is sent to the cloud platform 420. Correspondingly, the cloud platform 420 obtains the execution progress of the target task.

Operation 305: sending the task relay instruction to the target device, in which the task relay instruction includes the target task and the execution progress, and the target device is configured to execute the target task according to the execution progress.

In a possible embodiment, the task relay instruction is adopted to control the target device to continue to execute the target task. In other words, after the cloud platform receives the execution progress of the target task sent by the first device, the target task and its execution progress carried by the cloud platform is sent to the target device. Therefore, the target device may obtain the task (the target task) that needs to be relayed, automatically adjust the target task to the execution progress, and continue to execute the target task from the execution progress.

Optionally, after receiving the task relay instruction and adjusting the target task to the execution progress, the target device may pause to the execution progress until it receives a continuation execution instruction for the target task information. Then the target device starts from the execution progress to continue to perform the target task. Optionally, the continuation execution instruction may be generated by the user's triggering operation on the target device.

As shown in FIG. 4, when executing task relay, the cloud platform 420 obtains the playback progress (the execution progress) of video A in the first device 410 is 13:20, carry the target task and the execution progress "Video A+13:20" in the task relay instruction, and send the task relay instruction with "Video A+13:20" to the target device 430 (smart TV). Then the smart TV may search for the video A after receiving the task relay instruction, open the video playback interface 431 of the video A, and adjust the playback progress of video A to 13:20, so as to continue to play video A from 13:20. Optionally, when adjusting the playback progress of video A to 13:20, the smart TV may pause the playback until it receives the playback instruction for video A, and then start playing from the current playback progress of 13:20.

In the present embodiment, by obtaining the target task type of the target task (task to be relayed), the target device is determined from a plurality of second devices to ensure that the target device is able to support the execution of the target task, thereby ensuring the smooth execution of the subsequent task relay. In addition, by obtaining the execution progress of the target task from the first device after the task relay condition is satisfied, and sending the task execution instruction to the target device, the target device may continue to execute the target task according to the execution progress, avoiding that the user needs to manually adjust the execution progress of the target task in the target device, thereby maintaining the continuity of the target task relay between different devices.

In another possible application scenario, if there is a task relay requirement when the user is in a mobile state, for example, the user watches a movie on a mobile phone on the way home, and the movie may not be finished when the user returns home, there is a need to relay the movie on a TV located at home. It shows that the target device may also be determined according to the target location indicated by the first device location change information when performing the cross-device task relay.

In an illustrative example, based on FIG. 3, as shown in FIG. 5, operation 302 and operation 303 may be replaced by operation 501 and operation 502.

Operation 501: determining the target location indicated by the location change information according to the location change information.

The first device state information also includes the location change information of the first device, and the location change information may be the location coordinate change information of the first device within a preset duration. For example, the first device transmits the current location coordinates to the cloud platform in real time, and the cloud platform receives the current location coordinates within the preset duration, and analyze the possible travel destination of the user holding the first device according to the change of the location coordinates.

In a possible embodiment, the cloud platform may pre-obtain multiple locations that the user frequently visits, such as home, company, or school, and store them in association with the user account in advance. When the user returns home from the company, the first device sends the location coordinate information to the cloud platform in real-time, then the cloud platform may determine the moving direction of the first device as from the company to home according to the location change information within a period of time, and then determine the target location is home.

In other possible embodiments, the location change information may also include information of the means of transportation that the user takes. For example, when the user uses the first device as a subway card to enter a subway station, or uses the first device as a bus card to take a bus, then the first device may upload transportation information such as the subway or the bus taken by the user to the cloud platform. The cloud platform analyzes the subway station that the user enters and the subway route of the subway station, or analyzes the bus station and bus route that the user takes, so as to determine the target location to which the user takes the subway or the bus to reach.

Operation 502: determining the target device from at least one second device according to the target location, in which each second device corresponds to its location, and the target device is located at the target location.

Different second devices correspond to their places or locations respectively. For example, the smart TV is located at home, the projector is located at the company, the desktop computer is located at the company, and the notebook computer is located at home.

In order to make the determined target device conform to the user's moving destination, in a possible embodiment, when screening the target device, the target location indicated by the location change information of the first device is used as the filtering condition. In other words, the target device needs to be located at the target location indicated by the location change information.

Correspondingly, when multiple relay devices (second devices) are stored in the cloud platform, their location information needs to be stored at the same time, and the location information may be the location remarked next to the second device identification, for example, "TV (home), computer A (company), computer B (home), etc.; or the location coordinates of the second device are marked directly next to them, for example: "TV (111, 112), computer B (101, 187), etc.

In an illustrative example, if the target location indicated by the location change information is determined as "home" according to the location information of the first device that, then the second device located at "home" may be determined as the target device. For example, if the smart TV is located at home, the smart TV is determined as the target device.

Optionally, if at least two second devices are determined to be located at the target location, in order to avoid determining multiple second devices as target devices to occupy device resources, in a possible embodiment, the device relay priority of different second devices in the location may be set up. When determining the target device, at least one candidate device from the second device according to the target location is determined first. If there are more candidate devices matching the target location, then the device relay priority of each second device in the target location is obtained, and the second device with the highest device relay priority is determined as the target device.

In an illustrative example, if the target location is determined as "home", the corresponding second devices at the target location include a smart TV, a tablet computer, and a laptop computer, and the device relay priority of each second device is: the smart TV>the laptop computer>the tablet computer. The second device with the highest device relay priority is selected as the target device. In other words, the smart TV is determined as the target device.

Optionally, if the second device with the highest device priority is not able to perform the task relay, for example, the second device is not connected to the power supply, the battery is low, the network state is poor, or it is executing other tasks (is not able to perform multiple tasks at the same time), etc., the next-level second device may be selected as the target device according to the device relay priority. For example, if the smart TV is not able to perform the task relay, then adopt the next-level laptop as the target device, and so on until the target device is determined.

In the present embodiment, when the first device state information contains the location change information of the first device, the cloud platform may analyze the target location of the target device based on the location change information, such that the target device may be screened according to the target location, thereby the moving destination of the target device is consistent with that of the first device, so as to meet the task relay requirement in a specific moving scenario.

In another possible application scenario, if the target device is only determined according to any one of the target task type or the target location, when the user is in a mobile state, for example, the user is on the way home, if the target device is only determined according to the target task type, which may result in the target device determined is not located at home (i.e., not at the target location), but elsewhere, resulting in the need to switch target devices. Alternatively, determining the target device based solely on the target location may result in that the target device is not able to perform the target task, or in other words, it does not match the target task type. Therefore, in order to improve the accuracy of determining the target device, in a possible embodiment, the target location and the target task type are combined as the comprehensive screening condition, such that at least one target device is determined from the second devices.

In an illustrative example, operation 303 may further include the following operations 303A and 303B.

Operation 303A: determining the target location indicated by the location change information according to the location change information.

In a possible embodiment, the target device needs to be comprehensively determined according to the two conditions of the target location and the target task type. The first device needs to report the location change information of the first device and the target task type of the target task to the cloud platform. After receiving the location change information, the cloud platform determines the target location indicated by the location change information, and then comprehensively determines the target device based on the target location and the target task type.

Optionally, the target task type may be determined by the cloud platform based on the target task uploaded by the first device, or the first device directly uploads the target task and its target task type to the cloud platform, and the cloud platform obtains the target task type.

For the method of determining the target location, reference may be made to the foregoing embodiments, and details are not described in the present embodiment.

Operation 303B: Determining the target device from the at least one second device according to the target location and the target task type, in which the target device is located at the target location, and the task type of the task supported by the target device matches the target task type.

In order to further improve the accuracy of determining the target device, in a possible embodiment, the cloud platform obtains the target task information running in the first device, determines the target task type of the target task (the task to be relayed), obtains the location change information of the first device, determine the target location indicated by the location change information, and take the target task type and target task as the comprehensive screening condition for determining the target device. In other words, the target device needs to support the target task type of the target task, and also needs to at the target location.

In an illustrative example, if the target location is determined as "home" and the target task type is video playback, and the second device matching the target task type includes "a smart TV, a tablet computer, a smart phone, a projection device, a desktop computer, an e-book reader, a smart speaker, and an audio device", among which, the smart TV, the e-book reader, and the smart speaker are located at home; the projection device, the audio device, and the tablet computer are located in the company; the smartphone is carried with the user. "Home+video playback type" is taken as the screening condition to filter multiple second devices, from which the smart TV may be determined as the target device.

In another possible embodiment, if at least two candidate relay devices satisfying the above screening condition are determined, the target device may be determined from multiple candidate relay devices according to the preset device relay priority. The method for determining the target device from multiple candidate relay devices according to the device relay priority may refer to the above embodiments, and details are not described in the present embodiment.

In the present embodiment, the cloud platform adopts the target task type and the target location as the comprehensive screening condition, and determines the target device from the second devices, such that the target device may support the operation of the target task be at the location where the user expects to perform the task relay, improving the accuracy of determining the target device, and avoiding the cumbersomeness of task relay caused by the need to switch target device.

Since the cloud platform plays a role in coordinating the target device in advance in the cross-device task relay scenario, the cloud platform needs to accurately estimate whether the task running in the first device needs to be relayed and then determine the timing of whether to relay the task. Therefore, in a possible embodiment, the cloud platform analyzes whether the target task has been finished after it reaches the target location according to the first device state information provided by the first device to determine whether the target task needs the cross-device relay.

In an illustrative example, as shown in FIG. 6, which is a flowchart of a cross-device task relay method according to another exemplary embodiment of the present disclosure. In the present embodiment of the present disclosure, this method performed by the cloud platform shown in FIG. 1 is taken as an example for illustration. The method includes the following operations.

Operation 601: acquiring a first device state information of a first device, in which the first device state information at least includes a target task information running in the first device and a location change information of the first device.

When analyzing whether to perform the cross-device relay for the target task, the cloud platform needs to consider the completion of the target task when arriving at the target location, and the target location needs to be determined by the location change information of the first device. Therefore, in a possible embodiment, the first device not only needs to upload the running target task information to the cloud platform, but also needs to upload the location change information. In other words, the first device state information needs to include the target task information and location change information, such that after obtaining the first device state information, the cloud platform may determine the device for relay based on the target task information, and may be obtain the target location by analyzing the location change information, and then estimate whether the user needs to relay the task.

Optionally, the location change information may also be used to determine the target device, and the location change information may include real-time location information of the first device.

Optionally, the target task information may be uploaded simultaneously with the location change information, or the target task information may be uploaded separately from the location change information.

When the first device carried by the user is in a moving state, the location information of the first device may change with time, and during the changing of the location information of the first device, the target task information running in the first device may not change. If the target task information is carried and reported together with the location change information, it will obviously lead to the repeated reporting of the target task information. Therefore, in a possible embodiment, when the target task information does not change, only the location change information is reported in real time, and when the target task information is changed, the changed target task information and the current location change information are uploaded at the same time.

Operation 602: acquiring a first duration required for the target task to be executed and completed by the first device.

In the cross-device task relay scenarios, only if the target task is not able to be executed by the first device, it needs to continue to be executed by the target device. Therefore, in a possible embodiment, it is necessary to obtain the time (in other words, the first duration) required for the completion of the execution, combined with the location change information, to predict whether there is a need for the target task to be executed through cross-device relay.

Regarding the method of determining the first duration, in a possible embodiment, it may be determined according to the total execution duration required by the target task and the current execution duration of the target task. In other words, the difference between the total execution duration and the current execution duration is the first duration.

In an illustrative example, the first device is playing video A, the current video playback progress of video A is 13:50, and the total video duration of video A is 01:20:50, then the first duration is the difference between the total video duration and the current video playback progress, which is 1 hour and 7 minutes.

Operation 603: determining a second duration required to reach the target location according to the location change information.

In order to determine the second duration, it is necessary to determine the target location and the vehicle the user is taking or the user's moving speed based on the location change information. Therefore, in a possible embodiment, the cloud platform analyzes the location change information uploaded by the first device, and determines the target location indicated by the location change information, and the vehicle or moving speed indicated by the location change information. The method of determining the target location and the vehicle may refer to the above embodiments, which will not be repeated in the present embodiment.

By determining the moving speed according to the location change information, the cloud platform may estimate the moving speed through a displacement formula according to the location coordinate information of the first device received within a preset time period.

In a possible embodiment, if the target location and the vehicle are determined according to the location change information, the second duration for the vehicle to reach the target location may be determined according to the running speed of the vehicle. Take the subway as an example, the subway moving speed, the target location and the current location are obtained to estimate the second duration required to reach the target location from the current location.

In another possible embodiment, the cloud platform may estimate the moving speed of the user (the first device) according to location change information within the preset time period, and then estimate the second duration required to reach the target location from the current location based on the current location and target location uploaded by the first device.

In an illustrative example, if the distance between the target location and the current location is 36 km, and the moving speed of the first device (the user) is 20 m/s, then the second duration required to reach the destination is 30 minutes.

Operation 604: in response to the first duration being greater than the second duration and determining the target device according to the first device state information, in which the target device is different from the first device.

The condition for judging whether the target task needs to be executed across devices is: judging whether the target task may be finished execution when it arrives at the target location, then comparing the relationship between the first duration and the second duration. If the first duration is longer than the second duration, indicating that the target task is not able to be completed when arriving at the target location, the target task may need to be executed across devices. If the first duration is less than the second duration, meaning that the target task may be completed before reaching the target location, there is no need to execute the target task across devices.

In an illustrative example, if the first duration is 1 hour and 7 minutes, the second duration is 30 minutes, and the first duration is longer than the second duration, indicating that video A is not able to be finished playing when it reaches the target location, and cross-device playback may be required. If the first duration is 20 minutes, the second duration is 30 minutes, and the first duration is shorter than the second duration, indicating that video A may be finished playing before reaching the target location, and there is no need to play video A across devices.

In the scenario where the target task needs to be performed across devices, or, the first duration is longer than the second duration, the cloud platform needs to coordinate multiple second devices in advance, and determine the target device according to the first device state information, and prepare for the subsequent target task relay.

Optionally, for the scenario where the target task does not need to be performed across devices, or, the first duration is less than the second duration, the cloud platform may send a data reporting instruction to the first device, and the first device may continue to report the first device state information to the cloud platform, then the cloud platform continues to estimate whether the first device has the requirement to perform cross-device target task relay.

Operation 605: acquiring a second device state information of the target device, in which the second device state information includes at least one of a system state information, a network state information, and a power state information.

In a possible application scenario, although the target device is pre-determined, if the network state of the target device is poor, or the target device has a system update task, or the power of the target device is low, the target device may not be able to perform the target task, resulting in a failure of the target task relay. For example, the target device is powered off and the target task is not able to continue to be executed. Therefore, in order to avoid the relay failure in the subsequent task relay, in a possible embodiment, after determining the target device, the cloud platform pre-communicates with the target device to obtain the second device state information of the target device, so as to judge whether the target device satisfies the second condition, or the task execution condition, according to the obtained second device state information.

The second device state information may include a system state information, a network state information, a power supply state information, etc., and the embodiments of the present disclosure do not limit the specific content of the second device state information. The system state information may be the system version information of the target device, the network state information may refer to whether the target device is in a networked state, and the network state information corresponding to the connected network (for example, network speed), and the power state information may refer to the current power of the target device, whether it is in a charging state, and whether it is in a power saving mode, etc.

Optionally, after determining the target device, the cloud platform may send a pre-communication instruction to the target device, and after receiving the pre-communication instruction, the target device sends its second device state information to the cloud platform.

In a possible application scenario, there is a possibility that the target device is not connected to the Internet, the corresponding target device may not be able to receive the pre-communication instruction sent by the cloud platform. If the cloud platform sends the pre-communication instruction to the target device, and no response is received from the target device within a preset time, it is determined that the target device does not meet the second condition (the task relay condition), and then the target device may be re-selected from other second devices. For example, a candidate device with a lower priority for cross-device relay serves as the target device, and pre-communication is performed with that target device again.

Operation 606: in response to the second device state information satisfying the second condition and the first device and the target device satisfying the first condition, controlling the target device to continue to execute the target task.

Corresponding to the content of the second device state information, the second condition may include at least one of a system condition, a network condition, and a power supply condition.

Exemplary, the system condition may be that the system state of the target device is the latest system version, or the target device does not have a system version update requirement. The network condition may be that the target device is in a networked state, or the target device is in a wireless network connection state, or the network speed of the target device is higher than the network speed threshold. The power condition may be that the remaining power of the target device is higher than the power threshold; or the target device is not in a power saving mode, or the target device is in a charging state, etc. Optionally, the network speed threshold may be 1.5 M/s, and the power threshold may be 40%.

Optionally, since different target tasks may have different requirements for the network state and the power state. For example, video tasks have higher requirements for the network state and the power state, while music playback tasks have lower requirements for the network state and the power state. In order to meet the individualized requirements of different target tasks, in a possible embodiment, different second conditions may also be set up for different target task types.

Exemplary, taking the power condition as an example, since video tasks have higher requirements for the power state than music playback tasks, the power condition for video tasks may be that the remaining power of the target device is higher than the first power threshold, and the power condition for music playing tasks may be that the remaining power of the target device is higher than the second power threshold, and the first power threshold is higher than the second power threshold. Exemplary, the first power threshold may be 60%, and the second power threshold may be 40%.

Optionally, the second condition may also include that the target device is in an idle state. Since the target device needs to perform the target task, when the target device is playing a video, and the target task (the relay task) is also a video playback task, the execution of the target task by the device will obviously affect the running state of the target device. Therefore, in a possible embodiment, the cloud platform obtains the running state of the target device, if the target device is not running other tasks or is in an idle state, it means that the second condition is satisfied.

As for the system condition, the cloud platform determines whether the system state of the target device is the latest system version by comparing the current system version information of the target device with the latest system version information. If the system state of the target device is the latest system version, the cloud platform determines that there is no need to update the system before executing the target task. If the system state of the target device is not the latest system version, in order to avoid the need to update the system before executing the target task, the cloud platform send a system update instruction to the target device in advance to ensure that the system update is completed before executing the target task. Optionally, if the system state of the target device is not the latest system version, other available devices may also be selected as the target device to perform the target task relay.

As for the network condition, the cloud platform obtains the network state information of the target device, for example, the type of network connected to the target device, such as a wireless network, a 4G/5G network, a wireless hotspot, etc. For some target tasks that consume large amount of data, the target device connected to the wireless network meets the network conditions. For some target tasks that consume small amount of data, the network type is not limited, but the target device connected to the wireless network is preferred. If the network state is the network speed of the target device, a network speed threshold is set up. In other words, the target device with the network speed greater than or equal to the network speed threshold meets the task execution condition, for example, the network speed threshold is 1.5 M/s.

As for the power condition, if the target device is in the power connection state, it means that the target device meets the power condition. Alternatively, the cloud platform obtains the remaining power of the target device and compares the relationship between the remaining power and the power threshold, if the remaining power of the target device is greater than the power threshold, the target device meets the power condition. The power threshold may be set up by the user and uploaded to the cloud platform, or a default value may be adopted as the power threshold. For example, the power threshold is 40%.

In a possible embodiment, if the second device state information of the target device satisfies at least one of the above-mentioned second conditions (the task execution condition), it means that the target device may be adopted to execute the target task. And after the first device and the target device meet the first condition (the task relay condition), the target device is controlled to continue to execute the target task.

Operation 607: in response to the second device state information not satisfying the second condition, and sending a device state update instruction to the target device, in which the target device is configured to update the state according to the device state update instruction.

In a possible embodiment, if the second device state information does not meet the second condition, in order to facilitate the subsequent target task relay, the cloud platform may send the device state update instruction to the target device. The cloud platform may update the system after receiving the device state system update instruction sent by the target device, to ensure that the system has been updated to the latest system version before subsequent execution of the target task.

If the second condition is the system condition, but the obtained current system version information of the target device is not the latest system version information, in other words, the target device does not meet the task execution condition (the second condition). In order to ensure that the target device meets the system condition, in a possible embodiment, the cloud platform may send the system update instruction to the target device. After receiving the system update instruction sent by the cloud platform, the target device may update the system in advance, to ensure that the system has been updated to the latest system version before the target task is subsequently executed.

If the task execution condition is the network condition, when the target device is not connected to the wireless network, a network switching instruction may be sent to the target device, and the target device may switch from the 4G network to the wireless network after receiving the network switching instruction.

Optionally, after the target device updates the state information according to the device state update instruction, indicating that the updated device state information of the target device satisfies the task execution condition, the target device may continue to determine whether the first device and the target device meet the task relay condition (the first condition), and control the target device to continue to execute the target task.

Optionally, when the second device does not meet the second condition (the task execution condition), in order to ensure the smooth execution of the target task in the target device, other second devices may be switched as the target device. Then the second device that satisfies the second condition may be selected as the target device, so as to perform the target task relay process.

In the present embodiment, by comparing the time required for the completion of the target task in the first device and the second duration required to reach the target location, the target task needs to be performed across devices is determined. And when cross-device relay is needed, multiple second devices are coordinated in advance to determine the target device in order to prepare for the subsequent task relay. In addition, the target device is determined, and is first communicated in order to determine whether the target device meets the task execution condition, so as to ensure the normal execution of the target task in the target device.

In order to further decrease the power consumption of the target device, the target device is controlled to perform the target task when the first device is close to the target device. In a possible embodiment, the timing of executing the target task relay may be determined based on the distance between the first device and the target device, and the timing of executing the target task relay may also be determined by the network environment information of the first device and the target device (if the first device and the target device are connected to the same network, the distance between the target device and the first device is relatively close).

In an illustrative example, as shown in FIG. 7, which is a flowchart of a cross-device task relay method according to another exemplary embodiment of the present disclosure. In the present embodiment of the present disclosure, this method performed by the cloud platform as shown in FIG. 1 is taken as an example for illustration. The method includes the following operations.

Operation 701: acquiring a first device state information of a first device, in which the first device state information includes at least a target task information running in the first device.

Operation 702: determining a target device according to the first device state information, in which the target device is different from the first device.

For embodiments of operation 701 and operation 702, reference may be made to the foregoing embodiments, and details are not described in the present embodiment.

Operation 703: acquiring a first network environment information of the first device and a second network environment information of the target device.

The network environment information may refer to a network name of the network to which the device is connected, or an Internet Protocol (IP) address of the network.

When the first device and the target device are in the same network environment, for example, the first device and the target device are connected to the same wireless network, indicating that the first device and the target device are covered by the same network so the first device and the target device are relatively close. Therefore, the cloud platform may determine whether the first device and the target device are relatively close by acquiring the network environment information of the first device and the network environment information of the target device, thereby determining the timing for relaying the target task.

Operation 704: in response to the first network environment information matching the second network environment information, determining that the network condition is satisfied, and controlling the target device to continue to execute the target task.

Since the network condition is to determine whether the distance between the first device and the target device is relatively close, the network condition may include that the first device and the target device are connected to the same wireless network, or that the first device is connected to the wireless hotspot of the target device, or that the target device is connected to the wireless hotspot of the first device, etc.

In order to further decrease the power consumption of the target device, when the first device and the target device are relatively close, the target task is executed synchronously in the target device. In a possible embodiment, the network condition may be adopted as the task relay condition (the first condition). In other words, when the network environment information of the first device and the target device match with each other, for example, the first device and the target device are connected to the same network, then it is determined that the first device and the target device meet the network condition, and the target device is controlled to continue to execute target task.

Optionally, when the target device is connected to the wireless hotspot of the first device, or the first device is connected to the wireless hotspot of the target device, the first device and the target device also meet the network condition, then the target device is controlled to continue to execute the target task.

Operation 705: acquiring the distance between the first device and the target device.

In a possible embodiment, the distance between the first device and the target device may be directly used to determine that the first device and the target device are relatively close, and the cloud platform obtains the first location coordinates of the first device and the second location coordinates of the target device respectively, so as to calculate the distance between the first device and the target device.

In an illustrative example, if the first location coordinates of the first device are (x1, y1), taking a planar map (such as a navigation map) as an example, in which x1 represents the abscissa of the first device on the planar map, y1 represents the ordinate of the first device on the planar map, and the second location coordinates of the target device is (x2, y2), in which x2 represents the abscissa of the target device on the plan map, and y2 represents the ordinate of the target device on the planar map. In the present embodiment, d represents the distance between the first device and the target device.

Optionally, the user may upload the location coordinates of each device to be relayed to the cloud platform in advance. During the cross-device task relay process, the cloud platform may obtain the location coordinates of the target device, and then determine the distance between the first device and the target device.

Operation 706: in response to the distance being less than a distance threshold, determining that the distance condition is satisfied, and controlling the target device to continue to execute the target task.

The distance threshold may be set up by the user, or a system default value is adopted as the distance threshold. For example, the distance threshold is 100 m.

In a possible embodiment, when the distance between the first device and the target device is less than the distance threshold, it means that the distance between the first device and the target device is relatively close. Therefore, the distance condition in the first condition is satisfied, then the target device is controlled to perform the target task.

In an illustrative example, if the distance between the first device and the target device is 80 m, which is less than the distance threshold of 100 m, indicating that the first device and the target device are relatively close. For example, when the user goes home (the target device is located at home) or when the user is about to arrive home, the target task needs to be performed on the target device, such that the user may directly continue the unfinished target task on the target device.

In another possible application scenario, although the cloud platform will predict in advance whether the target task is able to be completed when reaching the destination according to the execution progress of the target task in the first device, so as to determine whether it is necessary to coordinate the target device in advance. However, there is a possibility that the user does not want to perform the target task across devices. Therefore, before waking up the target device to perform the target task, a task prompt message may be sent to the first device to remind the user whether to relay the target task.

After determining that the first device and the target device meet the task relay condition (the first condition), or in other words, after satisfying the network condition or the distance condition, the following operations may also be included.

First: sending a task relay prompt to the first device, in which the task relay prompt is configured to remind whether to carry out cross-device task relay.

In a possible embodiment, if the first device and the target device meet the first condition, or in other words, when the first device and the target device are relatively close, the cloud platform sends the task relay prompt to the first device. After receiving the task relay prompt sent by the cloud platform, the first device may display the task relay prompt on the current task interface, so as to remind the user whether to carry out cross-device task relay.

The content of the task relay prompt includes the target device (name), so as to remind the user which device to wake up as the target device. Optionally, a cancel control or a confirmation control is also displayed of the task relay prompt, such that the user may confirm whether to carry out the cross-device task relay.

For example, video playing is the target task, as shown in FIG. 8, which is a schematic process diagram of a first device triggering a task relay according to an exemplary embodiment of the present disclosure. The first device 800 is playing video A on the video playback interface 801. At this time, the first device 800 receives the task relay prompt sent by the cloud platform, and the task relay prompt 802 is displayed on the video playback interface 801, "Coming home soon, awakening the TV to relay the play", and the confirmation control 803 and the cancel control 804 are displayed of the task relay prompt. Optionally, only the cancel control 804 may be displayed of the task relay prompt (In other words, the confirmation control 803 is not displayed).

Optionally, the name of the candidate relay device may also be displayed of the task relay prompt. The cloud platform not only feeds back the name of the target device to the user, in order to provide the user with more candidate relay devices, when the cloud platform determines that two or more candidate relay devices are available for the task, the cloud platform may also feedback the device information of the candidate relay devices to the first device, from which the user may select the candidate relay device to perform the task relay.

Second: in response to receiving a confirmation operation of the task relay prompt, controlling the target device to continue to execute the target task.

In a possible embodiment, if performing the target task relay on the target device indicated by the task relay prompt is needed, the user may click the confirmation control of the task relay prompt. After receiving the confirmation operation of the task relay prompt, the cloud platform may control the target device to continue to execute the target task. In other words, the target device is waked up to execute the target task in the target device.

Optionally, when the first device is in a screen-on state, the task relay prompt may be in the form of a full-screen prompt (toast), and the task relay prompt may be canceled after a preset time period. If no user operation of the task relay prompt is received within the preset time period, the cross-device task relay is taken as the default operation. The preset time period may be 5 s.

In another possible embodiment, if the user clicks the cancel control of the task relay prompt, the cloud platform receives the cancel operation of the task relay prompt, and then determines that the user does not need to perform cross-device task relay. After that, the cloud platform terminates operations such as waking up the target device and executing the target task in the target device.

As shown in FIG. 8, when the user clicks the confirmation control 803 of the task relay prompt 802, then the cloud platform receives the confirmation operation of the task relay prompt, and executes the subsequent task of waking up the TV and playing the video on the TV. When the user clicks the cancel control 804 of the task relay prompt 802, the cloud platform receives the cancel operation of the task relay prompt, and terminates the subsequent task of waking up the TV and playing the video on the TV. Optionally, if the confirmation control 803 of the task relay prompt is not displayed, and if the cloud platform does not receive the cancel operation of the task relay prompt within 5 seconds, the TV will be woken up by default and the video will be played on the TV.

Optionally, if the first device is in the screen-off state when receiving the task relay prompt sent by the cloud platform, the task relay prompt may be in the form of a lock screen notification, and vibration and sound prompts are provided to remind the user timely.

In a possible embodiment, when receiving a confirmation operation of the task relay prompt, the cloud platform needs to wake up the target device. Executing the target task in the target device may include the following operations.

First, controlling the target device to start.

In a possible embodiment, the cloud platform may send a task relay instruction to the target device after receiving the confirmation operation of the task relay prompt, and the target device first starts the target device after receiving the task relay prompt, or in other words, the target device switches from a power-off state to a power-on state.

Optionally, if the target device is a device with a display screen, since the user has not yet arrived at the target location where the target device is located, in order to decrease the power consumption of the target device, the target device may be in a screen-off state.

Second, sending the target task and the execution progress of the target task to the target device, in which the target device is configured to execute the target task according to the execution progress.

In a possible embodiment, the cloud platform obtains the execution progress of the target task from the first device, and sends the execution progress and the target task to the target device. After receiving the above information, the target device may execute the target task and adjust the execution progress of the target task to the execution progress.

In an illustrative example, the target task is video playback, after receiving the target video and the playback progress of the target video, the target device opens an application that plays the target video in the back-end, and open the target video in the application, and adjust the playback progress of the target video to the playback progress in the first device. During this process, the TV maintains the screen-off state.

After the target task is adjusted to the execution progress, the user may not perform the target task in the target device. For example, if the user has not yet arrived at the target location of the target device, the target device will synchronize the current task progress of the target task in the first device in real time. Only when it is sensed that the user needs to continue to execute the target task in the target device, the target task is continued to be executed on the target device.

In an illustrative example, the target task is video playback and the target device is a TV, the TV turns on the TV camera in the screen-off state, and continuously collects images from the front of the TV. When the user sits at the front of the TV, whether there is a target face in the collected front-end image is analyzed. The target face is the face of the user holding the first device. If the target face exists, it means that the user has arrived at home and needs to relay the target video on the TV. The TV is switched from the screen-off state to the screen-on state, and the target video is continued to be played from the current playback progress.

As shown in FIG. 9, is a schematic process diagram of a target device triggering a task relay. When the target device 900 (the smart TV) receives the task relay instruction sent by the cloud platform, the target device 900 starts, the front part switches to the screen-off state, and the back-end part updates the TV system (the update system process may be performed after receiving the task relay instruction), and automatically open the application of the target task, find the video resource, and adjust the video to the execution progress in the first device. Meanwhile, the TV camera is turned on. When the TV camera recognizes the target face, the screen will be switched from the screen-off state to the screen-on state, and the current interface displays the current download speed of 234 MB/s and the source of video A (the first device), and displays the playback progress of video A as 13:20 and the total playing time as 40:20. After being switched to the screen-on state, the video A is being relayed, or in other words, the video A is played on the video playback interface 901 from 13:20.

In the present embodiment, by setting up the task relay condition (the first condition), or in other words, the network condition or the distance condition, when the first device and the target device are relatively close, the first device triggers the relay, and after receiving the confirmation operation of the task relay prompt, the target device performs the subsequent task relay process. During the entire cross-device task relay process, the user only needs to perform a few operations to realize the transfer of the target task between the first device and the target device, which simplifies the operation process of the cross-device task relay.

It should be noted that the embodiments of the present disclosure only take the target task relay between two devices as an example, but the target task relay among two or more devices is similar to the process shown in the above embodiments. The embodiments are not described in detail.

The following are embodiments of the apparatus provided by the present disclosure, which may be used to implement the method in the present embodiment of the present disclosure. For details not disclosed in the embodiments provided by the present disclosure, please refer to the method embodiments of the present disclosure.

As illustrated in FIG. 10, which is a structural block diagram of a cross-device task relay apparatus according to an embodiment of the present disclosure. The apparatus has the function of realizing the above-mentioned method in the embodiments, and the function may be realized by a hardware, or may be realized by executing a software by the hardware. As shown in FIG. 10, the apparatus may include a first acquiring module 1001, a first determining module 1002 and a first control module 1003.

The first acquiring module 1001 is configured to obtain a first device state information of a first device, and the first device state information includes at least a target task information running in the first device.

The first determining module 1002 is configured to determine a target device according to the first device state information, and the target device is different from the first device;

The first control module 1003 is configured to control the target device to continue to execute the target task in response to the first device and the target device satisfying a first condition.

Optionally, the first determination module 1002 includes a first acquiring unit and a first determining unit.

The first acquiring unit is configured to acquire a target task type of the target task.

The first determining unit is configured to determine the target device from at least one second device according to the target task type, each second device corresponds to a task type of a task supported by the each second device, and the target task type of the task supported by the target device matches the target task type.

Optionally, the first device state information further includes a location change information of the first device.

The first determination module 1002 also includes a second determining unit and a third determining unit.

The second determining unit is configured to determine a target location indicated by the location change information according to the location change information.

The third determining unit is configured to determine the target device from at least one second device according to the target location, and each second device corresponds to its location, and the target device is located at the target location.

Optionally, the first device state information further includes the location change information of the first device.

The first determination unit is also configured to: determine the target location indicated by the location change information according to the location change information; and determine the target device from at least one second device according to the target location and the target task type, in which the target device is located at the target location, and the task type of the task supported by the target device matches the target task type.

Optionally, the apparatus also includes a second acquiring module, a second determining module and a third determining module.

The second acquiring module is configured to acquire a first duration required for the target task to be executed and completed in the first device.

The second determining module is configured to determine a second duration required to reach the target location according to the location change information.

The third determining module is configured to execute the operation of determining a target device according to the first device state information in response to the first duration being greater than the second duration.

Optionally, the task relay condition includes any one of a distance condition and a network condition.

The first control module 1003 includes a first control unit or a second control unit.

The first control unit is configured to acquire a first network environment information of the first device and a second network environment information of the target device; in response to the first network environment information and the second network environment information matching with each other, determine that the network condition is satisfied, and control the target device to continue to execute the target task.

The second control unit is configured to acquire the distance between the first device and the target device; in response to the distance being less than a distance threshold, determine that the distance condition is met, and control the target device to continue to execute the target task.

Optionally, the first control module 1003 further includes a first sending unit and a third control unit.

The first sending unit is configured to send a task relay prompt to the first device, and the task relay prompt is configured to remind whether to carry out the cross-device task relay.

The third control unit is configured to control the target device to continue to execute the target task in response to receiving a confirmation operation of the task relay prompt.

Optionally, the first control module 1003 includes a second acquiring unit and a second sending unit.

The second acquiring unit is configured to acquire an execution progress of the target task in the first device.

The second sending unit is configured to send a task relay prompt to the target device, the task relay prompt includes the target task and the execution progress, and the target device is configured to execute the target task.

Optionally, the apparatus also includes a third acquiring module, a second control module and a sending module.

The third acquiring module is configured to acquire a second device state information of the target device, and the second device state information includes at least one of a system state information, a network state information, and a power state information.

The second control module is configured to: in response to the second device state information satisfying a second condition, execute the operation of controlling the target device to continue to execute the target in response to the first device and the target device satisfying a first condition. The second condition includes at least one of a system condition, a network condition, and a power supply condition.

The sending module is configured to: in response to the second device state information not satisfying the second condition, send a device state update instruction to the target device. The target device is configured to perform the state update according to the device state update instruction.

In summary, in the present embodiment of the present disclosure, the first device and the target device are connected through the cloud platform, such that the cloud platform may pre-coordinate and organize target devices that are available for cross-device task relay according to the obtained first device state information. After the first condition is met, the target device is automatically controlled to execute the target task of the first device. Compared with the related art, which requires the user to select the second device, select the application and execute the target task, the cross-device task relay method provided in the present embodiment of the present disclosure may realize the execution of the same task on different devices without the user's perception. The cross-device task relay method reduces the processes required for the relay execution of the same task in different devices, decreases the operational complexity of executing tasks across devices, thereby improving the efficiency of task relay across devices, and at the same time avoids the interruption of the coherent execution of tasks due to device replacement.

It should be noted that when the apparatus provided by the above-mentioned embodiments realizes its functions, it only uses the division of the above-mentioned functional modules as an example. In practical applications, the above-mentioned function distribution may be completed by different functional modules according to needs. The internal structure of the system is divided into different functional modules to complete all or part of the functions described above. In addition, the apparatus and the method provided by the above embodiments belong to the same idea, and the specific embodiment process thereof is detailed in the method embodiment, and will not be repeated.

Figure 11:
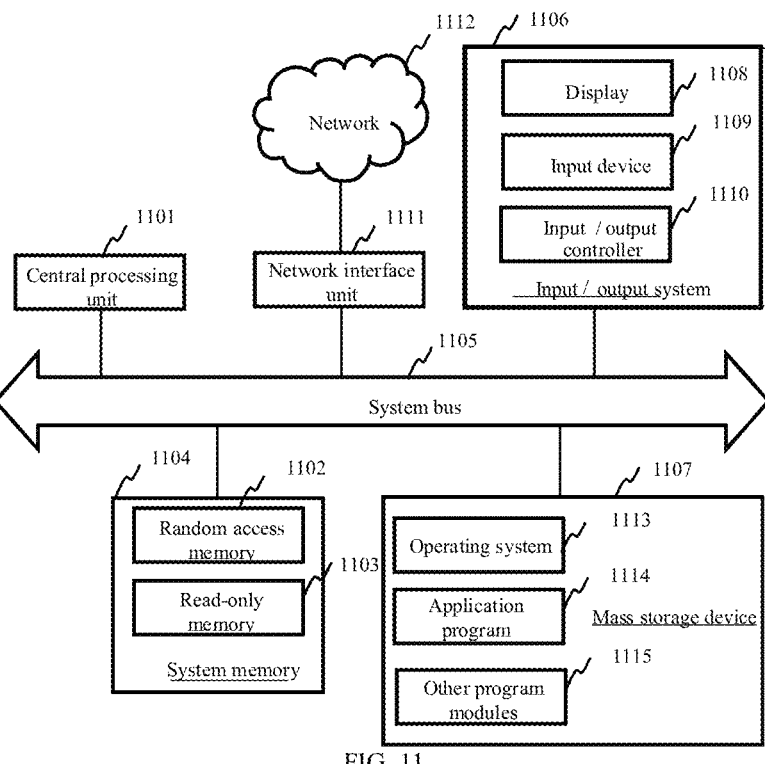
FIG. 11 is a structural block diagram of a server according to an embodiment of the present disclosure.

As illustrated in FIG. 11, which is a structural block diagram of a server according to an embodiment of the present disclosure. The server may be used to implement the cross-device task relay method performed by the cloud platform in the above embodiments.

Specifically, the server 1100 includes a central processing unit (CPU) 1101, a system memory 1104 consist of a random access memory (RAM) 1102 and a read-only memory (ROM) 1103, and a system bus 1105 connecting the system memory 1104 and the central processing unit 1101. The server 1100 also includes a basic input/output system (I/O system) 1106 that helps to transmit information between various devices in the server, and a mass storage device 1107 configured to store an operating system 1113, an application program 1114 and other program modules 1115.

The basic input/output system 1106 includes a display 1108 configured to display information and an input device 1109 such as a mouse and a keyboard for the user to input information. Both the display 1108 and the input device 1109 are connected to the central processing unit 1101 through the input and output controller 1110 of the system bus 1105. The basic input/output system 1106 may also include the input-output controller 1110 for receiving and processing input from the keyboards, the mouse, or the electronic stylus and other output devices. Similarly, the input and output controller 1110 also provides output to a display screen, a printer, or other types of output device.

The mass storage device 1107 is connected to the central processing unit 1101 through the mass storage controller (not shown) connected to the system bus 1105. The mass storage device 1107 and its associated computer-readable storage media provide non-volatile storage for the server 1100. That is to say, the mass storage device 1107 may include a computer-readable non-transitory storage medium (not shown) such as a hard disk or a Compact Disc Read-Only Memory (CD-ROM) drive.

Without loss of generality, the computer-readable storage media may include computer storage media and communication media. The computer storage media includes volatile and nonvolatile, removable and non-removable media implemented by any method or technology for storage of information such as computer readable storage instructions, data structures, program modules or other data. The computer storage media include RAM, ROM, Erasable Programmable Read-Only Memory (EPROM), Electrically-Erasable Programmable Read-Only Memory (EEPROM), flash memory or other solid-state storage technologies, and CD-ROM, Digital Versatile Disc (DVD) or other optical storage, tape cartridges, tape, disk storage or other magnetic storage devices. Certainly, those skilled in the art know that the computer storage media are not limited to the above-mentioned ones. The above-mentioned system memory 1104 and the mass storage device 1107 may be collectively referred to as the memory.

One or more programs are stored in the memory, and the one or more programs are configured to be executed by one or more central processing units 1101, one or more programs include instructions for implementing the above method embodiments. The central processing unit 1101 executes the cross-device task relay method provided by the above embodiments achieved by the one or more programs implement.

According to various embodiments of the present disclosure, the server 1100 may also run a remote server connected to the network, such as the Internet. In other words, the server 1100 may be connected to the network 1112 through the network interface unit 1111 connected to the system bus 1105, or may also be connected to other types of networks or remote server systems (not shown) through the network interface unit 1111.

The memory also includes one or more programs, the one or more programs are stored in the memory, and the one or more programs include the operations performed by the cloud platform for executing the method provided by the embodiments of the present disclosure.

The embodiment of the present disclosure also provides a computer-readable non-transitory storage medium, the computer-readable non-transitory storage medium stores at least one program code, and the program code is loaded and executed by a processor to realize the cross-device task relay method described in the above embodiments.

According to an aspect of the present disclosure, a computer program product or a computer program is provided. The computer program product or the computer program includes computer instructions stored in a computer readable non-transitory storage medium. The processor of the server reads the computer instructions from the computer-readable non-transitory storage medium, and the processor executes the computer instructions to enable the server to execute the cross-device task relay method provided in various optional embodiments of the above aspects.

An embodiment of the present disclosure provides a cross-device task relay method, the method is performed by a cloud platform. The method includes: acquiring a first device state information of a first device, in which the first device state information includes at least a target task information running in the first device; determining a target device according to the first device state information, in which the target device is different from the first device; in response to the first device and the target device satisfying a first condition, controlling the target device to continue to execute the target task.

In some embodiments, the determining a target device according to the first device state information includes: acquiring a target task type of the target task; and determining the target device from at least one second device according to the target task type, wherein each second device corresponds to a task type of a task supported by the each second device, and the task type of the task supported by the target device matches the target task type.

In some embodiments, the first device state information further includes a location change information of the first device. The determining the target device according to the first device state information includes: determining a target location indicated by the location change information according to the location change information; and determining the target device from at least one second device according to the target location, wherein each second device corresponds to its location, and the target device is located at the target location.

In some embodiments, the first device state information further includes a location change information of the first device. The determining the target device from at least one second device according to the target task type includes: determining a target location indicated by the location change information according to the location change information; and determining the target device from at least one second device according to the target location and the target task type, wherein the target device is located at the target location, and the task type of the task supported by the target device matches the target task type.

In some embodiments, before the determining the target device according to the first device state information, the method further includes: acquiring a first duration required for the target task to be executed and completed in the first device; determining a second duration required to reach the target location according to the location change information; and in response to the first duration being greater than the second duration, performing the operation of determining a target device according to the first device state information.

In some embodiments, the first condition includes any one of a distance condition and a network condition. The controlling the target device to continue to execute the target task in response to the first device and the target device satisfying a first condition includes: acquiring a first network environment information of the first device and a second network environment information of the target device; in response to the first network environment information matching the second network environment information, determining that the network condition is satisfied, and controlling the target device to continue to execute the target task; or acquiring a distance between the first device and the target device; in response to the distance being less than a distance threshold, determining that the distance condition is satisfied, and controlling the target device to continue to execute the target task.

In some embodiments, the first condition includes any one of a distance condition and a network condition. The controlling the target device to continue to execute the target task in response to the first device and the target device satisfying a first condition includes: acquiring a first network environment information of the first device and a second network environment information of the target device; in response to the first network environment information matching the second network environment information, determining that the network condition is satisfied, and controlling the target device to continue to execute the target task; or acquiring a distance between the first device and the target device; in response to the distance being less than a distance threshold, determining that the distance condition is satisfied, and controlling the target device to continue to execute the target task.

In some embodiments, the controlling the target device to continue to execute the target task further includes: sending a task relay prompt to the first device, wherein the task relay prompt is configured to remind whether to perform the cross-device task relay; and in response to receiving a confirmation operation of the task relay prompt, controlling the target device to continue to execute the target task.

In some embodiments, the controlling the target device to continue to execute the target task includes: acquiring an execution progress of the target task running in the first device; and sending a task relay instruction to the target device, wherein the task relay instruction comprises the target task and the execution progress, and the target device is configured to execute the target task according to the execution progress.

In some embodiments, the in response to the first device and the target device satisfying a first condition, controlling the target device to continue to execute the target task further includes: acquiring a second device state information of the target device, wherein the second device state information comprises at least one of a system state information, a network state information, and a power state information; and in response to the second device state information satisfying a second condition, executing the operation of in response to the first device and the target device satisfying a first condition, controlling the target device to continue to execute the target task; wherein the second condition comprises at least one of a system condition, a network condition and a power condition; and in response to the second device state information not satisfying the second condition, sending a device state update instruction to the target device, wherein the target device is configured to perform state update according to the device state update instruction.

An embodiment of the present disclosure provides a cross-device task relay apparatus, the apparatus is applied to a cloud platform, and the apparatus includes a first acquiring module, a first determining module and a first control module. The first acquiring module is configured to acquire a first device state information of the first device, and the first device state information includes at least a target task information running in the first device. The first determining module is configured to determine a target device according to the first device state information, and the target device is different from the first device. The first control module is configured to control the target device to continue to execute the target task in response to the first device and the target device satisfying a first condition.

An embodiment of the present disclosure provides a cloud platform, and the cloud platform includes a processor and a memory. The memory stores at least one program code, and the program code is loaded and executed by the processor to realize the following operations: acquiring a first device state information of a first device, wherein the first device state information includes at least a target task information running in the first device; determining a target device according to the first device state information, wherein the target device is different from the first device; and in response to the first device and the target device satisfying a first condition, controlling the target device to continue to execute the target task.

In some embodiments, the at least one program code is further configured to be loaded by the processor to perform the following operations: acquiring a target task type of the target task; and determining the target device from at least one second device according to the target task type, wherein each second device corresponds to a task type of a task supported by the each second device, and the task type of the task supported by the target device matches the task type.

In some embodiments, the first device state information further includes a location change information of the first device, and the at least one program code is further configured to be loaded by the processor to execute the following operations: determining a target location indicated by the location change information according to the location change information; and determining the target device from at least one second device according to the target location, wherein the second device corresponds to its location, and the target device is located at the target location.

In some embodiments, the first device state information further includes a location change information of the first device, and the at least one program code is further configured to be loaded by the processor to execute the following operations: determining a target location indicated by the location change information according to the location change information; and determining the target device from at least one second device according to the target location and the target task type, wherein the target device is located at the target location, and the task type of the task supported by the target device matches the target task type.

In some embodiments, the at least one program code is also configured to be loaded by the processor to perform the following operations: acquiring a first duration required for the target task to be executed and completed in the first device; determining a second duration required to reach the target location according to the location change information; and in response to the first duration being greater than the second duration, performing the operation of determining a target device according to the first device state information.

In some embodiments, the first condition includes any one of a distance condition and a network condition, and the at least one program code is also configured to be loaded by the processor to execute the following operations: acquiring a first network environment information of the first device and a second network environment information of the target device; in response to the first network environment information matching the second network environment information, determining that the network condition is satisfied, and controlling the target device to continue to execute the target task; or acquiring a distance between the first device and the target device; in response to the distance being less than a distance threshold, determining that the distance condition is satisfied, and controlling the target device to continue to execute the target task.

In some embodiments, the at least one program code is also configured to be loaded by the processor to perform the following operations: sending a task relay prompt to the first device, wherein the task relay prompt is configured to remind whether to carry out the cross-device task relay; and in response to receiving a confirmation operation of the task relay prompt, controlling the target device to continue to execute the target task.

In some embodiments, the at least one program code is also configured to be loaded by the processor to perform the following operations: acquiring an execution progress of the target task in the first device; and sending a task relay instruction to the target device, wherein the task relay instruction comprises the target task and the execution progress, and the target device is configured to execute the target task according to the execution progress.

In some embodiments, the at least one program code is also configured to be loaded by the processor to perform the following operations: acquiring a second device state information of the target device, wherein the second device state information comprises at least one of a system state information, a network state information, and a power state information; in response to the second device state information satisfying a second condition, executing the operation of in response to the first device and the target device satisfying a first condition, controlling the target device to continue to execute the target task, wherein the second condition includes at least one of a system condition, a network condition and a power condition; and in response to the second device state information not satisfying the second condition, sending a device state update instruction to the target device, wherein the target device is configured to performs a state update according to the device state update instruction.

An embodiment of the present disclosure provides a computer-readable non-transitory storage medium, the computer-readable non-transitory storage medium stores at least one program code, and the program code is loaded and executed by the processor to implement the above-mentioned cross-device task relay method.

An embodiment of the present disclosure provides a computer program product or a computer program. The computer program product or the computer program includes computer instructions, and the computer instructions are stored in a computer-readable non-transitory storage medium. A processor of a server reads the computer instructions from the computer-readable non-transitory storage medium, and the processor executes the computer instructions to enable the server to execute the following cross-device task relay method: acquiring a first device state information of a first device, wherein the first device state information comprises at least a target task information running in the first device; determining a target device according to the first device state information, wherein the target device is different from the first device; and in response to the first device and the target device satisfying a first condition, controlling the target device to continue to execute the target task.

It should be understood that the "plurality" mentioned herein refers to two or more than two. "And/or" describes the association relationship of associated objects, indicating that there may be three types of relationships. For example, A and/or B may indicate: A exists independently, A and B exist simultaneously, and B exists independently. The character "/" generally indicates that the contextual objects have an "or" relationship. In addition, the numbering of the operations described herein only exemplarily shows a possible sequence of the operations. In some other embodiments, the above-mentioned operations may not be executed according to the order of the numbers, for example, two operations with different numbers are executed at the same time, or two operations with different numbers are executed in the reverse order as shown in the drawings, which are not limited in the present embodiments of the present disclosure.

The above are only optional embodiments of the disclosure, and are not intended to limit the disclosure. Any modifications, equivalent replacements, improvements, etc. made within the spirit and principles of the disclosure shall be included in the protection range of the disclosure.

What is claimed is:

1. A cross-device task relay method, wherein the method is performed by a cloud platform and the method comprises:
    acquiring a first device state information of a first device, wherein the first device state information comprises at least a target task information running in the first device;
    determining a target device according to the first device state information, wherein the target device is different from the first device; and
    in response to the first device and the target device satisfying a first condition, controlling the target device to continue to execute the target task;
    wherein the first device state information further comprises a location change information of the first device;
    wherein the determining the target device according to the first device state information comprises:
        determining a target location indicated by the location change information according to the location change information; and
        determining the target device from at least one second device according to the target location, wherein each second device corresponds to its location, and the target device is located at the target location;
    wherein before the determining the target device according to the first device state information, the method further comprises:

acquiring a first duration required for the target task to be executed and completed in the first device;

determining a second duration required to reach the target location according to the location change information; and in response to the first duration being greater than the second duration, performing the operation of determining a target device according to the first device state information.

2. The method according to claim 1, wherein the determining a target device according to the first device state information comprises:

acquiring a target task type of the target task; and determining the target device from at least one second device according to the target task type, wherein each second device corresponds to a task type of a task supported by the each second device, and the task type of the task supported by the target device matches the target task type.

3. The method according to claim 2, wherein the first device state information further comprises a location change information of the first device; and wherein the determining the target device from at least one second device according to the target task type comprises:

determining a target location indicated by the location change information according to the location change information; and determining the target device from at least one second device according to the target location and the target task type, wherein the target device is located at the target location, and the task type of the task supported by the target device matches the target task type.

4. The method according to claim 1, wherein the first condition comprises any one of a distance condition and a network condition; and wherein the controlling the target device to continue to execute the target task in response to the first device and the target device satisfying a first condition comprises:

acquiring a first network environment information of the first device and a second network environment information of the target device; in response to the first network environment information matching the second network environment information, determining that the network condition is satisfied, and controlling the target device to continue to execute the target task; or acquiring a distance between the first device and the target device; in response to the distance being less than a distance threshold, determining that the distance condition is satisfied, and controlling the target device to continue to execute the target task.

5. The method according to claim 4, wherein the controlling the target device to continue to execute the target task further comprises:

sending a task relay prompt to the first device, wherein the task relay prompt is configured to remind whether to perform the cross-device task relay; and in response to receiving a confirmation operation of the task relay prompt, controlling the target device to continue to execute the target task.

6. The method according to claim 1, wherein the controlling the target device to continue to execute the target task comprises:

acquiring an execution progress of the target task running in the first device; and sending a task relay instruction to the target device, wherein the task relay instruction comprises the target task and the execution progress, and the target device is configured to execute the target task according to the execution progress.

7. The method according to claim 1, wherein the in response to the first device and the target device satisfying a first condition, controlling the target device to continue to execute the target task further comprises:

acquiring a second device state information of the target device, wherein the second device state information comprises at least one of a system state information, a network state information, and a power state information; and in response to the second device state information satisfying a second condition, executing the operation of in response to the first device and the target device satisfying a first condition, controlling the target device to continue to execute the target task; wherein the second condition comprises at least one of a system condition, a network condition and a power condition; and in response to the second device state information not satisfying the second condition, sending a device state update instruction to the target device, wherein the target device is configured to perform state update according to the device state update instruction.

8. A cloud platform, wherein the cloud platform comprises a processor and a memory, the memory stores at least one program code, and the at least one program code is loaded by the processor to perform the following operations:

acquiring a first device state information of a first device, wherein the first device state information comprises at least a target task information running in the first device;

determining a target device according to the first device state information, wherein the target device is different from the first device; and in response to the first device and the target device satisfying a first condition, controlling the target device to continue to execute the target task;

wherein the first device state information further comprises a location change information of the first device, and the at least one program code is further configured to be loaded by the processor to execute the following operations:

determining a target location indicated by the location change information according to the location change information; and determining the target device from at least one second device according to the target location, wherein the second device corresponds to its location, and the target device is located at the target location;

wherein the at least one program code is also configured to be loaded by the processor to perform the following operations:

acquiring a first duration required for the target task to be executed and completed in the first device;

determining a second duration required to reach the target location according to the location change information; and in response to the first duration being greater than the second duration, performing the operation of determining a target device according to the first device state information.

9. The cloud platform according to claim 8, wherein the at least one program code is further configured to be loaded by the processor to perform the following operations:

acquiring a target task type of the target task; and determining the target device from at least one second device according to the target task type, wherein each second device corresponds to a task type of a task supported by the each second device, and the task type of the task supported by the target device matches the task type.

10. The cloud platform according to claim 9, wherein the first device state information further comprises a location change information of the first device, and the at least one program code is further configured to be loaded by the processor to execute the following operations:

determining a target location indicated by the location change information according to the location change information; and determining the target device from at least one second device according to the target location and the target task type, wherein the target device is located at the target location, and the task type of the task supported by the target device matches the target task type.

11. The cloud platform according to claim 8, wherein the first condition comprises any one of a distance condition and a network condition, and the at least one program code is also configured to be loaded by the processor to execute the following operations:

acquiring a first network environment information of the first device and a second network environment information of the target device; in response to the first network environment information matching the second network environment information, determining that the network condition is satisfied, and controlling the target device to continue to execute the target task; or, acquiring a distance between the first device and the target device; in response to the distance being less than a distance threshold, determining that the distance condition is satisfied, and controlling the target device to continue to execute the target task.

12. The cloud platform according to claim 11, wherein the at least one program code is also configured to be loaded by the processor to perform the following operations:

sending a task relay prompt to the first device, wherein the task relay prompt is configured to remind whether to carry out the cross-device task relay; and in response to receiving a confirmation operation of the task relay prompt, controlling the target device to continue to execute the target task.

13. The cloud platform according to claim 8, wherein the at least one program code is also configured to be loaded by the processor to perform the following operations:

acquiring an execution progress of the target task in the first device; and sending a task relay instruction to the target device, wherein the task relay instruction comprises the target task and the execution progress, and the target device is configured to execute the target task according to the execution progress.

14. The cloud platform according to claim 8, wherein the at least one program code is also configured to be loaded by the processor to perform the following operations:

acquiring a second device state information of the target device, wherein the second device state information comprises at least one of a system state information, a network state information, and a power state information;

in response to the second device state information satisfying a second condition, executing the operation of in response to the first device and the target device satisfying a first condition, controlling the target device to continue to execute the target task, wherein the second condition comprises at least one of a system condition, a network condition and a power condition; and in response to the second device state information not satisfying the second condition, sending a device state update instruction to the target device, wherein the target device is configured to perform a state update according to the device state update instruction.

15. A computer-readable non-transitory storage medium, wherein at least one program code is stored in the computer-readable non-transitory storage medium, and the program code is loaded and executed by a processor to realize the following cross-device task relay method:

acquiring a first device state information of a first device, wherein the first device state information comprises at least a target task information running in the first device;

determining a target device according to the first device state information, wherein the target device is different from the first device; and in response to the first device and the target device satisfying a first condition, controlling the target device to continue to execute the target task;

wherein the first device state information further comprises a location change information of the first device;

wherein the determining the target device according to the first device state information comprises:

determining a target location indicated by the location change information according to the location change information; and determining the target device from at least one second device according to the target location, wherein each second device corresponds to its location, and the target device is located at the target location;

wherein before the determining the target device according to the first device state information, the method further comprises:

acquiring a first duration required for the target task to be executed and completed in the first device;

determining a second duration required to reach the target location according to the location change information; and in response to the first duration being greater than the second duration, performing the operation of determining a target device according to the first device state information.

* * * * *